(12) United States Patent
Zhang et al.

(10) Patent No.: US 10,740,332 B2
(45) Date of Patent: Aug. 11, 2020

(54) MEMORY-AWARE PLAN NEGOTIATION IN QUERY CONCURRENCY CONTROL

(71) Applicant: Futurewei Technologies, Inc., Plano, TX (US)

(72) Inventors: Mingyi Zhang, Santa Clara, CA (US); Huaizhi Li, Belmont, CA (US); Yu Dong, San Jose, CA (US); Cheng Zhu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 431 days.

(21) Appl. No.: 15/411,713

(22) Filed: Jan. 20, 2017

(65) Prior Publication Data

US 2018/0210916 A1 Jul. 26, 2018

(51) Int. Cl.
*G06F 16/2453* (2019.01)
*G06F 16/2455* (2019.01)

(52) U.S. Cl.
CPC .. *G06F 16/24542* (2019.01); *G06F 16/24561* (2019.01)

(58) Field of Classification Search
CPC ............... G06F 16/24542; G06F 16/24561
See application file for complete search history.

(56) References Cited

U.S. PATENT DOCUMENTS

| | | | |
|---|---|---|---|
| 7,051,034 B1 | 5/2006 | Ghosh et al. | |
| 7,409,517 B2 | 8/2008 | Dageville et al. | |
| 8,577,871 B2 | 11/2013 | Dageville et al. | |
| 8,600,977 B2 | 12/2013 | Dageville et al. | |
| 2003/0065688 A1 | 4/2003 | Dageville et al. | |
| 2005/0125452 A1* | 6/2005 | Ziauddin | G06F 16/217 |
| 2006/0190430 A1 | 8/2006 | Luo et al. | |
| 2012/0136850 A1 | 5/2012 | Barsness et al. | |

(Continued)

FOREIGN PATENT DOCUMENTS

| | | |
|---|---|---|
| CN | 102999377 A | 3/2013 |
| CN | 104408088 A | 3/2015 |

OTHER PUBLICATIONS

Dageville et al., "SQL Memory Management in Oracle9i", Proceedings of the 28th VLDB Conference, Hong Kong, China, 2002.
PCT/CN2018/073245, ISR, dated Apr. 17, 2018.

*Primary Examiner* — Belix M Ortiz Ditren
*Assistant Examiner* — Dustin D Eyers
(74) *Attorney, Agent, or Firm* — Vierra Magen Marcus LLP

(57) ABSTRACT

Embodiments of the present technology relate managing database query concurrency. A method of the present technology can include receiving a query, generating a first query plan that can be used to execute the query in system memory without any system memory constraints, and estimating a system memory cost for executing the query in the system memory using the first query plan. The method can also include placing the query in a queue if available system memory does not satisfy the estimated system memory cost. The method can further include conditionally selecting the query from the queue, conditionally generating a second query plan for the query that can be used to execute the query in the system memory in compliance with a system memory constraint, and conditionally executing the query in the system memory.

17 Claims, 6 Drawing Sheets

(56) References Cited

U.S. PATENT DOCUMENTS

2014/0280285 A1* 9/2014 Quinion ............... G06F 16/951
　　　　　　　　　　　　　　　　　　　　　　　707/766
2015/0286678 A1* 10/2015 Casaletto ........... G06F 16/2455
　　　　　　　　　　　　　　　　　　　　　　　707/718

* cited by examiner

MEMORY-AWARE PLAN NEGOTIATION IN QUERY CONCURRENCY CONTROL

BACKGROUND

Queries that run against very large data warehouses are complex. The execution time of the queries can range from seconds to hours, or even to days. The long-running queries can require the use of memory-intensive operators, such as sort and/or hash-join. The operators use system memory to sort their input data and/or to join their data sets. The amount of system memory allocated to the operators affects the query's performance, such as the elapsed time. Typically, the larger the system memory space that is available for executing a query, the better performance the query achieves. However, there is only limited system memory available in a computer system, and the system memory is shared by all concurrent queries and operators. Therefore, a challenge for database systems is to design an effective strategy to manage query concurrency levels given limited system memory resources.

Effectively managing of query concurrency levels on a database system can be a complex task. If too many concurrent requests are allowed to execute, the database system will perform poorly because of resource contention, e.g., memory resource contention. Uncontrolled high contention on system memory resources can cause severe performance problems, such as out of memory (OOM) errors, occurring in the computer system and can result in a database crash. On the other hand, if too few queries are allowed to execute, then system memory resources can be under-utilized and result in a long queue of queries waiting to be executed, thereby causing the database system performance to suffer.

A typical approach of commercial database systems to managing query concurrency levels is the use of threshold-based system configuration parameters, such as multi-programming levels (MPLs). MPLs specify the upper limit of the number of queries that are allowed to run concurrently in a database system. If the number of concurrent queries reaches the threshold, the system will reject newly arriving queries being admitted. This type of approach relies on database administrators to supply an "optimal" setting for the configuration parameter. However, while setting a static threshold for the number of queries that are allowed to execute concurrently may work well if queries are relatively equal in their resource requirements, this can lead to low performance or severe performance problems if the queries are extremely varied such as the ones present in a large data warehouse environment.

SUMMARY

In a first embodiment, there is a computer-implemented method for managing database query concurrency, comprising: receiving a query; generating a first query plan that can be used to execute the query in system memory without any system memory constraints; estimating a system memory cost for executing the query in the system memory using the first query plan; placing the query in a queue if available system memory does not satisfy the estimated system memory cost; conditionally selecting the query from the queue; conditionally generating a second query plan for the query that can be used to execute the query in the system memory in compliance with a system memory constraint; and conditionally executing the query in the system memory.

In a second embodiment according to the first embodiment, executing the query in the system memory using the first query plan that does not have any system memory constraints takes less time than executing the query in the system memory using the second query plan that complies with the system memory constraint.

In a third embodiment according to any of the first through second embodiments, the conditionally selecting the query from the queue is performed at regular negotiation intervals having a specified length.

In a fourth embodiment according to any of the first through third embodiments, the system memory constraint is equal to the available system memory when the query is selected from the queue.

In a fifth embodiment according to any of the first through fourth embodiments, the conditionally selecting the query from the queue comprises: when there are one or more queued queries in the queue, determining, for each queued query of the one or more queued queries, a ratio of an estimated system memory cost for a query plan generated for executing the queued query in the system memory without any system memory constraints to the available system memory; and selecting the query from the queue when the query has a highest ratio that also satisfies a specified threshold.

In a sixth embodiment according to any of the first through fifth embodiments, the conditionally generating the second query plan comprises attempting to generate the second query plan that complies with the system memory constraint within a negotiation interval.

In a seventh embodiment according to any of the first through sixth embodiments, the conditionally executing the query in the system memory comprises: executing the query in the system memory using the second query plan, if the second query plan has been generated for the query in compliance with the memory constraint within the negotiation interval; and executing the query in the system memory using the first query plan and using a statement level memory approach, which specifies an amount of the system memory that can be used to execute the query in the system memory and may include storing intermediate files in secondary storage, if the second query plan has not been generated for the query in compliance with the memory constraint within the negotiation interval.

In an eighth embodiment according any of the first through seventh embodiments, after the second query plan has been generated for the query in compliance with the memory constraint, the conditionally executing the query in the system memory comprises: determining whether the available system memory satisfies the estimated memory cost for executing the query using the first query plan generated without any system memory constraints; if the available system memory satisfies the estimated memory cost for executing the query using the first query plan generated without any system memory constraints, then instead of executing the query using the second query plan, executing the query using the first query plan; and if the available system memory does not satisfy the estimated memory cost for executing the query using the first query plan generated without any system memory constraints, then executing the query using the second query plan.

In a ninth embodiment according any of the first through seventh embodiments, after the second query plan has been generated for the query, the conditionally executing the query in the system memory comprises: determining whether the available system memory satisfies an estimated system memory cost for executing a newly received query in the system memory using a third query plan generated without any system memory constraints (wherein the third plan is for executing the newly received query); if the available system memory satisfies the estimated system memory cost for executing the newly received query in the system memory using the third query plan generated without any system memory constraints, then instead of executing the query using the second query plan, executing the newly received query using the third query plan; and if the available system memory does not satisfy the estimated system memory cost for executing the newly received query in the system memory using the third query plan generated without any system memory constraints, then executing the query using the second query plan.

In a tenth embodiment according any of the first through seventh embodiments, after the second query plan has been generated for the query, the conditionally executing the query in the system memory comprises: determining whether the available system memory satisfies at least one of the estimated memory cost for executing the query using the first query plan generated without any system memory constraints or an estimated system memory cost for executing a newly received query in the system memory using a third query plan for executing the newly received query generated without any system memory constraints; if the available system memory satisfies at least one of the estimated memory cost for executing the query using the first query plan generated without any system memory constraints or the estimated system memory cost for executing the newly received query in the system memory using the third query plan generated without any system memory constraints, then instead of executing the query using the second query plan, executing one of the query using the first query plan or the new query using the third query plan; and if the available system memory does not satisfy at least one of the estimated memory cost for executing the query using the first query plan generated without any system memory constraints or the estimated system memory cost for executing the newly received query in the system memory using the third query plan generated without any system memory constraints, then executing the query using the second query plan.

In an eleventh embodiment, a database query concurrency management system comprises: a non-transitory memory storage comprising instructions; and one or more processors in communication with the non-transitory memory storage, wherein the one or more processors execute the instructions to: receive a query; generate a first query plan that can be used to execute the query in system memory without any system memory constraints; estimate a system memory cost for executing the query in the system memory using the first query plan; place the query in a queue if available system memory does not satisfy the estimated system memory cost; conditionally select the query from the queue; conditionally generate a second query plan for the query that can be used to execute the query in the system memory in compliance with a system memory constraint, and conditionally execute the candidate query in the system memory.

In a twelfth embodiment, a non-transitory computer-readable medium stores computer instructions for managing database query concurrency, that when executed by one or more processors, cause the one or more processors to perform the steps of: receiving a query; generating a first query plan that can be used to execute the query in system memory without any system memory constraints; estimating a system memory cost for executing the query in the system memory using the first query plan; placing the query in a queue if available system memory does not satisfy the estimated system memory cost; conditionally selecting the query from the queue; conditionally generating a second query plan for the query that can be used to execute the query in the system memory in compliance with a system memory constraint; executing the query in the system memory using the second query plan if the second query plan has been generated for the query; and executing the query in the system memory using the first query plan and using a statement level memory approach, which specifies an amount of system memory that can be used to execute the query in the system memory and may include storing intermediate files on an auxiliary data storage device, if the second query plan has not been generated for the query.

This Summary is provided to introduce a selection of concepts in a simplified form that are further described below in the Detailed Description. This Summary and/or headings are not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Embodiments of the present technology generally relate to methods and systems for managing database query concurrency. In particular, such embodiments provide new and improved strategies for executing queries made to a database that make efficient use of memory resources available for executing queries, i.e. system memory. The present technology improves query concurrency levels while controlling memory contention at an acceptable high level. Thus, the utilization of all system resources, including memory, central processing unit (CPU), and input/output (I/O) devices, is improved, while severe performance problems, such as out of memory (OOM), are avoided. As a result, system performance improves as more queries are executed in the same amount of time and the average query response time becomes shorter. This greatly improves customers' user experience and can contribute to higher profitability for customers such as internet service providers.

In certain modern database management systems, the query concurrency control is often automated. The database system dynamically sets an "optimal" query concurrency level to adapt to highly varied queries. That is, the query concurrency level is high when the estimated costs (i.e., query memory costs) of arriving queries are low; while the query concurrency level is low when the estimated costs of arriving queries are high. As a result, the memory contention level is maintained at an acceptably high level, and the query concurrency level dynamically adapts to varied load under the memory constraint. In one approach, a query starts executing in the database system when its estimated system memory costs are not greater than the available system memory space. The query is queued if the available system memory is insufficient (i.e., the estimated system memory costs of the query are higher than the available system memory). The queued query may be de-queued for execution when one or more other queries complete execution and release the used memory resources.

Figure 1:
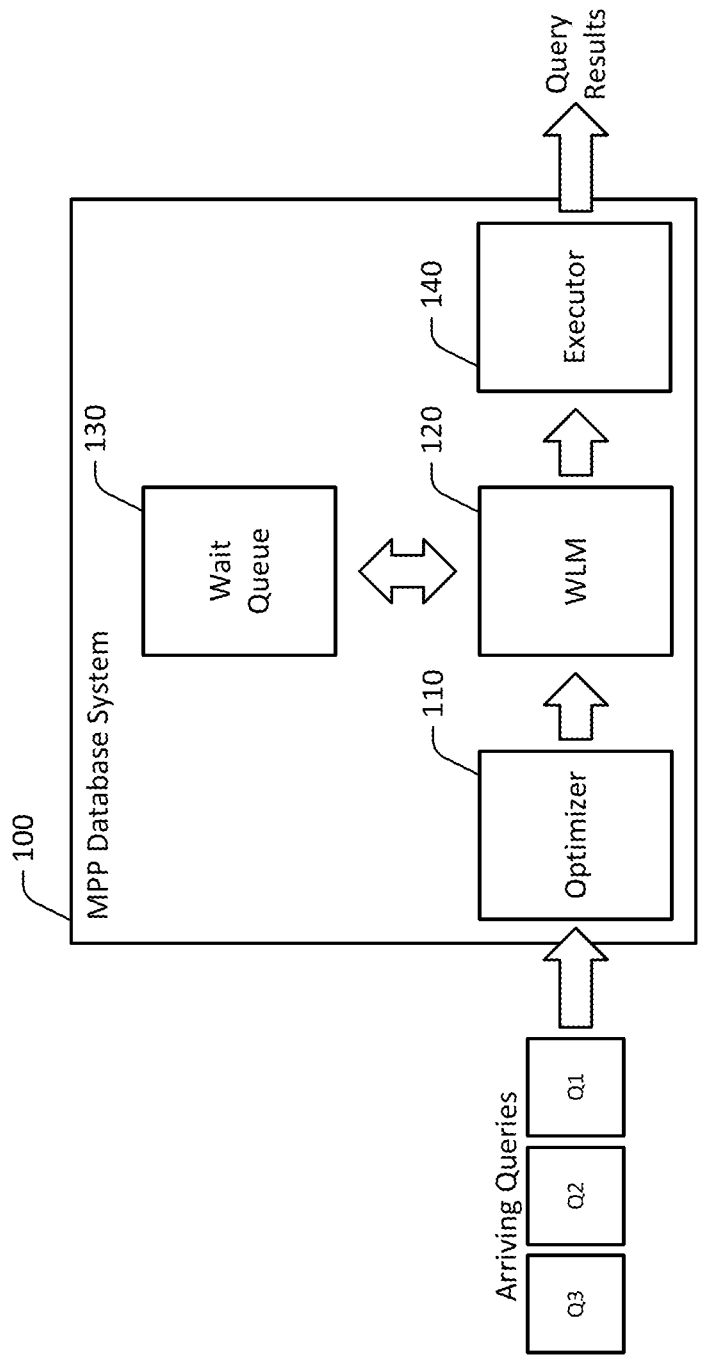
FIG. 1 is a block diagram that illustrates components of an exemplary massively parallel processing database system.
Figure 2:
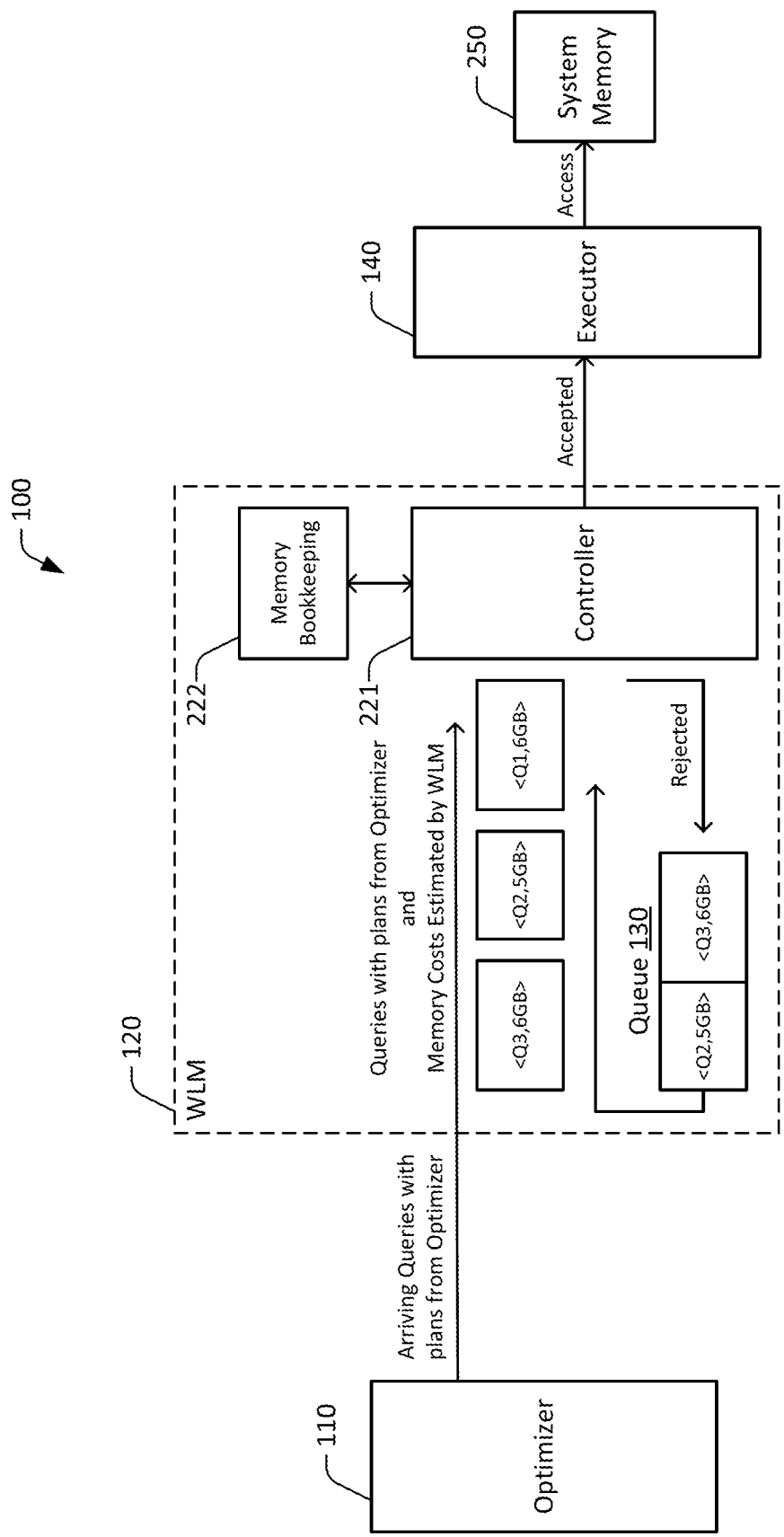
FIG. 2 is a block diagram that is similar to FIG. 1, but also provides additional details for the workload manager (WLM) introduced in FIG. 1.

FIGS. 1 and 2 are block diagrams that are useful for illustrating one exemplary approach for performing query concurrency control in a database system. More specifically, FIG. 1 illustrates components of an exemplary massively parallel processing (MPP) database system 100 that includes a query optimizer 110, a workload manager (WLM) 120, a wait queue 130 and a query executor 140. Depending upon implementation, the wait queue 130, which can be more succinctly referred to as the queue 130, can be considered part of the WLM 120, or can be considered a separate element from the WLM 120. FIG. 2 illustrates components of the WLM 120, including a controller 221 and a memory bookkeeper 222. FIG. 2 also shows that the controller 221 of the WLM 120 can pass an accepted query to the executor 140, and that the executor 140 can access system memory 250 of a computer system in order to execute the accepted query. More specifically, the executor 140 can use the system memory 250 to execute a query using a corresponding query plan that is generated for the query by the optimizer 110. Such a query plan can, for example, specify which operators, such as sort, nested-loop-join, and hash-join, are to be used to execute a query. The system memory 250 can be used to store instructions for executing the query plan, input data associated with a query, data sets that are to be joined, and/or the like.

FIG. 2 also provides details about how the WLM 120 can conduct the query concurrency control. Arriving queries are varied in terms of their memory costs. The controller 221 evaluates the queries and makes admission decisions (as to whether to send queries to the executor 140) based on two pieces of information, namely, the query's system memory costs, and the currently available system memory. In certain embodiments, the admission condition is that a query is sent to the executor 140 for execution if the estimated memory cost is not greater than (i.e., is less than or equal to) the available system memory. Otherwise, the query is queued if its estimated memory cost is greater than the available system memory. If the admission condition is satisfied, the controller 221 grants the evaluated query the required system memory resources, i.e., the system memory costs, and deducts the amount from the available system memory. When the query completes execution, it returns the granted system memory to the controller 221, and the controller 221 adds the system memory resources back to the available system memory.

In accordance with certain embodiments, the system memory 250, which can also be referred to as the main memory or the internal memory, is volatile read-write memory such a random access memory (RAM), dynamic RAM (DRAM), synchronous DRAM (SDRAM), a combination thereof, or the like, that is directly accessible to the central processing unit (CPU) (e.g., 710 in FIG. 7) of a computer system via a memory bus. In accordance with certain embodiments, the system memory 250 can be a portion (e.g., 720E in FIG. 7) of the memory (e.g., 720 in FIG. 7) that is set aside specifically for executing queries. By contrast, in accordance with certain embodiments, secondary storage (e.g., 730 in FIG. 7), which can also be referred to as external memory, auxiliary memory, peripheral storage or mass storage, includes one or more non-volatile storage devices that are not directly accessible by the CPU (e.g., 710 in FIG. 7) of a computer system. Such secondary storage is slower than system memory and is typically at least two orders of magnitude less expensive than system memory, and thus, typically has a much larger storage capacity than system memory. Exemplary types of secondary storage include, but are not limited to, magnetic disks, optical discs, magnetic tapes, and flash memory.

Referring to FIG. 1, the query optimizer 110, which can also be referred to more succinctly as the optimizer 110, is shown as receiving a plurality of queries, labeled Q1, Q2 and Q3, one after the other. In other words, Q1 is received first, followed by Q2, and followed by Q3. The MPP database system 100 is also shown as including a wait queue 130 that is associated with the WLM 120. The MPP database system 100, which can also be referred to more succinctly as the database system 100, can be, for example, an on-line analytical processing (OLAP) data warehouse system, but is not limited thereto.

Assume, for example, that the available system memory that the database system 100 can use for executing queries is 10 GB. Accordingly, the MPP database system 100 can utilize up to 10 GB to execute the three queries Q1, Q2 and Q3, which arrive at the MPP database system 100 one after the other. Also assume that the estimated memory costs of the three queries are 6 GB, 5 GB and 6 GB, respectively, which can be represented as <Q1, 6 GB>, <Q2, 5 GB> and <Q3, 6 GB>. In other words, the representation <Q1, 6 GB> indicates that that estimated memory cost associated with a query plan for the query Q1 is 6 GB. The estimated memory cost for a query, such as the query Q1, can be determined by the WLM 120 based on the query plan that is generated for the query Q1 by the optimizer 110.

Assume the query Q1 is admitted into the database system 100 and starts executing since its memory cost is 6 GB while the available system memory is 10 GB. In other words, the memory cost is lower than the available system memory, so the query is accommodated. When Q1 starts executing, the available system memory is reduced to 4 GB. Memory bookkeeping is handled by the WLM 120, and more specifically, by the memory bookkeeping 222. As shown in FIG. 2, after being admitted in the database system, the queries Q2 and Q3 are queued in the wait queue 130 (which can also be referred to more succinctly herein as the queue 130) because the available system memory of the computer system is only 4 GB. In other words, because the available system memory of the computer system is only 4 GB, the available system memory is insufficient for the query Q2, <Q2, 5 GB>, or the query Q3, <Q3, 6 GB>, to start their execution. From this, it can be appreciated that there are queries (i.e., queries Q2 and Q3 in this example) that have to be queued because of lack of system memory resources. On the other hand, the database system does have some system memory available (i.e., 4 GB). However, because of the load control mechanism being utilized, the available system memory cannot be allocated to the queued queries Q2 and Q3 to start their execution. Thus, in this example, up to 4 GB of system memory (and potentially more) is unused during the execution of the query plan for the query Q1. In other words, in this example, up to 40% of the available system memory (and potentially more) is wasted during the execution of the query plan for the query Q1, which is an inefficient use of the available system memory. Embodiments of the present technology address this and other issues.

More specifically, certain embodiments of the present technology improve query concurrency levels in database systems, such as, but not limited to, OLAP data warehouses. Such embodiments improve the system memory resource utilization, as well as other system resource utilization, such as those of a CPU and input/output (I/O) devices. This approach can also be applied to other database systems.

Figure 3:
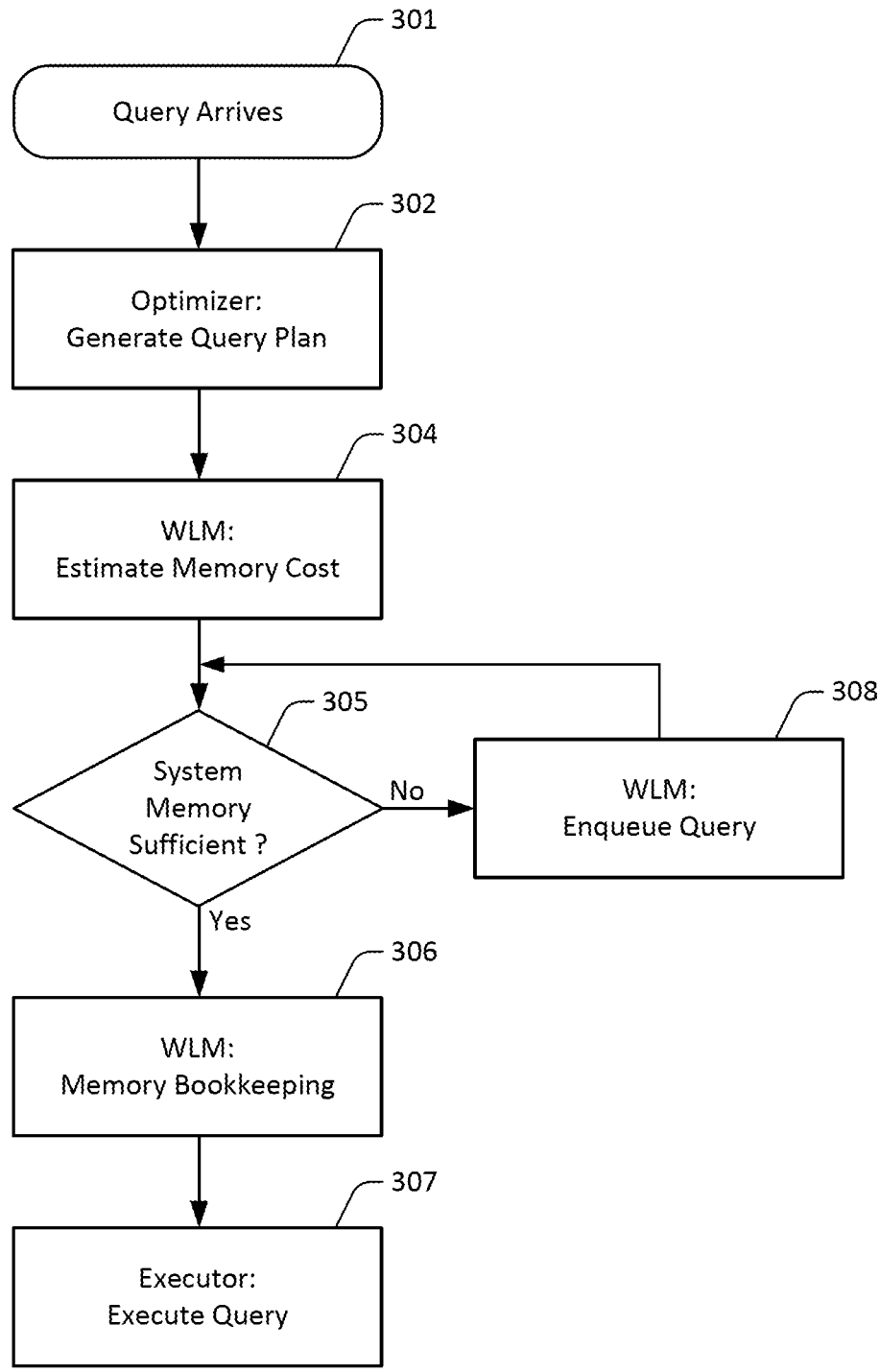
FIG. 3 is a high level flow diagram that is used to summarize one exemplary approach that the database system, introduced in FIG. 1, can use to execute queries.

FIG. 3 is a high level flow diagram that is used to summarize the above mentioned approach that the database system 100, introduced above with reference to FIG. 1, can use to execute queries. Referring to FIG. 3, at step 301 a query (e.g., Q1) arrives. At step 302, a query execution plan, which can also be referred to more succinctly herein as a query plan, is generated by the optimizer 110. At step 304, a system memory cost (e.g., 6 GB) for executing the query using the query plan (generated at step 302) is estimated by the WLM 120. At decision step 305, there is a determination whether there is sufficient system memory available for executing the query plan. For example, at step 305 there is a determination of whether the estimated memory cost (estimated at step 304) for executing the query using the query plan (generated at step 302) is less than or equal to the system memory that is currently available. If the answer to the determination at step 305 is No, then the query is put in the queue 130 by the WLM 120. If the answer to the determination at step 305 is Yes, then memory bookkeeping is performed by the WLM 120 at step 306, and the query is executed at step 307 by the executor 140 using the query plan (generated at step 302). For example, at step 306 the WLM subtracts from the currently available system memory (e.g., 10 GB) the estimated memory cost (e.g., 6 GB), to thereby update how much system memory will be available (e.g., 4 GB) while the query (e.g., Q1) is being executed using the query plan. After the query is finished being executed using the query plan, the system memory that was used to execute the query plan will be released, and the WLM 120 will update the available system memory to include the released memory.

As noted above, if the answer to the determination at step 305 is No, the query is placed in the queue 130 by the WLM 120, and more specifically by the controller 221 thereof. After a query is placed in the queue 130, the WLM 120 can periodically determine whether the currently available system memory is sufficient to execute one or more of the queued queries. When there are multiple queries included in the queue 130, priority can be given, for example, to the query that has been in the queue 130 for the longest period of time, or to the query that would utilize a largest percentage of the currently available system memory if its query plan were executed, or to a combination thereof, or based on some other basis.

Continuing with the example discussed above, assume that the query that arrived at step 301 is the query Q1 which has an estimated system memory cost of 6 GB, and that the total system memory available for executing queries is 10 GB. This would mean that while the query plan for query Q1 is being executed, the currently available system memory would be 4 GB, which would be kept track of by the WLM 120, and more specifically, the memory bookkeeper 222 thereof. Also assume that while the query plan for the query Q1 was being executed by the executor 140 that queries Q2 and Q3 arrived, and that there estimated memory costs (as determined at instances of step 304, following query plans being generated at instances of step 302) were 5 GB and 6 GB, respectively. Using the technique described with reference to FIG. 3, the queries Q2 and Q3 would be placed in the queue 130 at instances of steps 305 and 308. This would result in the 4 GB of currently available system memory being inefficiently unused while the query plan for the query Q1 was being executed. This would also result in the aging of the queries sitting in the queue 130. Accordingly, the above described approach does not fully utilize system memory resources, and the query concurrency level is sub-optimal.

Figure 4:
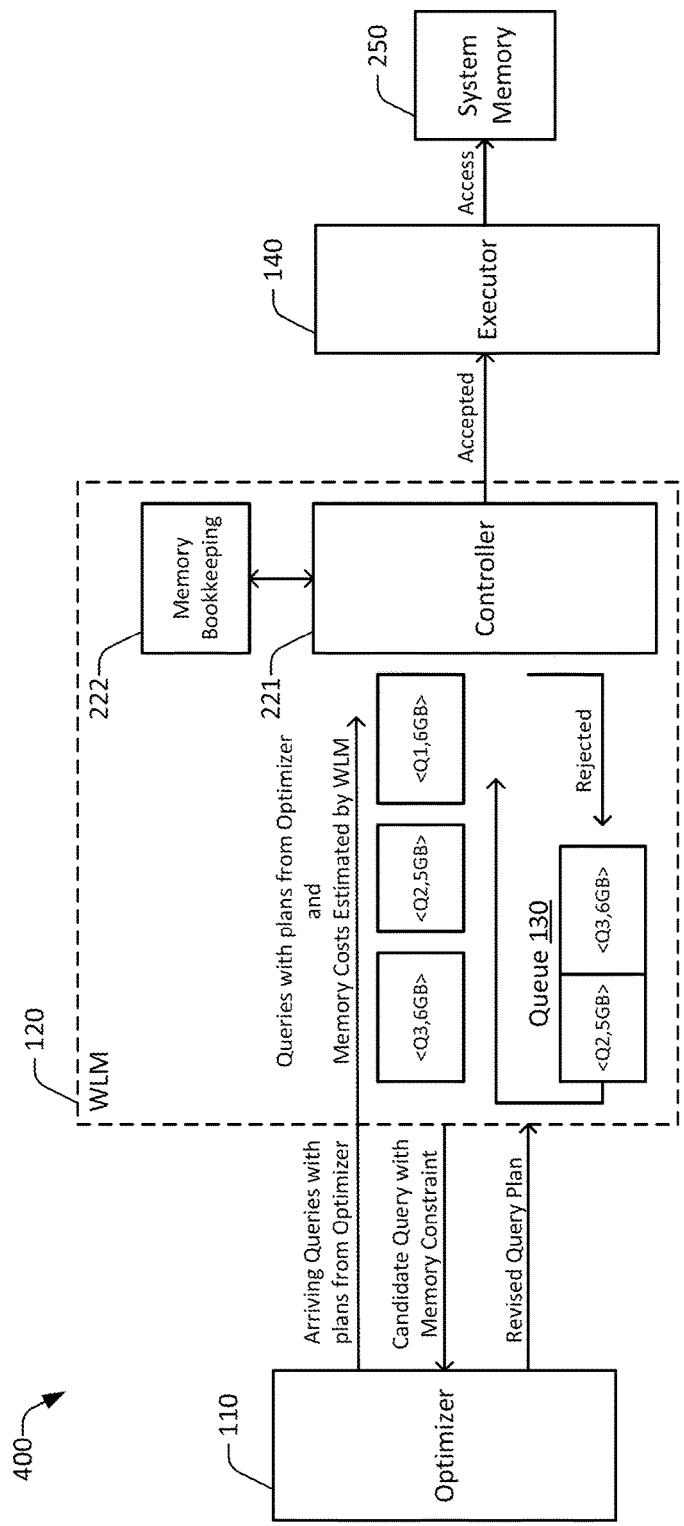
FIG. 4 is a block diagram that illustrates components of an exemplary database system according to an embodiment of the present technology.

FIG. 4 is a block diagram that illustrates components of an exemplary MPP database system 400 according to an embodiment of the present technology. Elements in FIG. 4 that are similar to those previously introduced above with reference to FIG. 1 and/or FIG. 2 are labeled the same, but as will be appreciated from the below discussion, may include additional functionality that is used to implement embodiments of the present technology. Referring to FIG. 4, in accordance with an embodiment of the present technology, when the optimizer 110 receives a query, it generates a query plan for the query without any memory constraints, and passes the query along with its query plan to the WLM 120. Such a query plan, which is initially generated for the query without any memory constraints, will often be referred to herein as an original query plan. In other words, an original query plan, as the term is used herein, refers to an initial query plan that is generated for a query without any memory constraints.

After the optimizer 110 generates the original query plan for the query (e.g., Q1), the WLM 120, and more specifically the controller 221 thereof, estimates a system memory cost for executing the original query plan in the system memory 250. Then, if the WLM 120 determines that there is sufficient system memory available to execute the query using the original query plan, the WLM 120 provides the query to the executor 140 so that the executor 140 can execute the query using the system memory 250 in accordance with the original query plan (i.e., using the original query plan). The memory bookkeeper 222 of the WLM 120 updates the amount of available system memory, which can also be referred to herein as the currently available system memory. While the system memory 250 is being used to execute the original plan for the query (e.g., Q1), the optimizer 110 may receive another query (e.g., Q2) for which the optimizer 110 generated a corresponding original query plan without any memory constraints. In accordance with certain embodiments of the present technology, which will be explained in additional detail below, if the WLM 120 determines that there is insufficient system memory available for executing the query (e.g., Q2) using the original query plan generated by the optimizer 110 without any memory constraints, then the WLM 120 will attempt to negotiate a new query plan (for the query Q2) with the optimizer 110. In other words, rather than simply placing the query Q2 in the queue 130 and waiting for the enough system memory to be freed to enable the original query plan to be used to execute the query Q2, the WLM 120 and the optimizer 110 will work together to determine whether a lower memory cost plan can be generated and used to begin executing the query Q2 using the available system memory. If the attempt to negotiate a new plan for the query Q2 is unsuccessful, e.g., because the optimizer 110 was unable to generate within a specified amount of time (also referred to as a negotiation interval) a new plan that can be used to execute the query Q2 with the memory constraint, then the query Q2 may thereafter be executed using a statement level memory approach that may utilize at least some secondary memory to execute the query Q2.

More generally, embodiments of the present technology add additional ways for executing a query, namely, a query plan negotiation option and a statement level memory approach option. In accordance with such embodiments, where a query with an original query plan (generated by the optimizer 110) has an estimated memory cost that is too large to be accommodated (i.e., where the memory cost for executing the original query plan exceeds the available system memory), the WLM 120 attempts to negotiate a new lower memory cost plan with optimizer 110 for the query under some memory constraint. This preferably enables query with the new query plan to start executing instead of remaining queued in the database system. The query plan negotiation is conducted between WLM 120 and the optimizer 110. In accordance with certain embodiments, the WLM 120 initiates the negotiation process by sending the query and the memory constraint to optimizer 110, and the optimizer 110 returns to the WLM 120 a new query plan for the query, assuming the optimizer 110 is able to do so within a negotiation interval. The new plan generation complies with the given memory constraint. Comparing the new plan with the original plan, the estimated memory costs of the query using the new plan are lower than that of using the original plan.

The new plan, which can also be referred to as 'lower-memory-cost' plan or a revised plan, may be generated by optimizer 110 through avoiding (or reducing) the use of the memory intensive operators in the execution plan. As an example, the original plan may use memory-intensive operators, such as hash-join, to join data sets. Such operators can consume a large amount of system memory. Instead of using hash-join, the new plan may use 'memory-saving' operators, such as nested-loop-join, to join the data sets. Accordingly, when the new query plan starts running, it will use much less memory than the original plan. Using the new plan, the execution time of the query may become longer, but its queuing (waiting) time is significantly reduced. In a busy data warehouse environment, the total elapsed time (where, elapsed time=execution time+queuing time) of a query can become much shorter than the original elapsed time as the queuing time of the query in the system can be very long.

In accordance with certain embodiments of the present technology, the plan negotiation is conducted in only one round. That is, given a memory constraint, if the optimizer 110 is unable to generate a new plan within a specified time period (referred to herein as the negotiation interval), the optimizer 110 will be 'timed out' and return nothing to WLM 120. In this case, the WLM 120 ends the negotiation and tries a statement level memory approach to send the query to executor 140 for execution. The statement level memory approach is a memory management approach, which restricts the system memory usage of a query during its execution, and may use secondary memory in addition to the system memory. Under the statement level memory approach, the WLM 120 sends the query to the executor 140 with some specified memory resources, and executor 140 then executes the query using the original query plan generated for the query and the specified amount of memory. An advantage of this statement level memory approach is the direct memory resource allocation at the query level, so the query concurrency level and the system's memory resource utilization can be well planned and maintained. On the other hand, a drawback of the statement level memory approach is the potentially low performance. For example, if the allocated system memory is very small, it can take a very long time for the query to complete its execution using the statement level memory approach. This is because the small amount of allocated system memory resources may cause the query to generate a large number of intermediate result files that are stored in secondary memory (e.g., on disk) during its execution, which results in the long execution time and low performance. Therefore, in using this approach, it can be subtle to specify the proper amount of memory for a query prior to its execution. Because of this drawback, in accordance with certain embodiments of the present technology, the statement level memory approach is only used when the query plan negotiation has 'timed out' or fails (in other words, the query plan negotiation approach is preferred).

Figure 5:
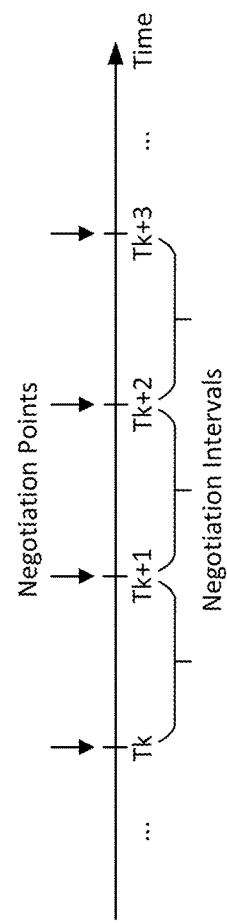
FIG. 5 is an exemplary timeline depicting regular intervals, referred to as negotiation intervals, at which a query plan negation may be performed, in accordance with certain embodiments of the present technology.

FIG. 5 is an exemplary timeline depicting regular intervals, referred to as negotiation intervals, at which a query plan negation may be performed, in accordance with certain embodiments of the present technology. In FIG. 5, the negotiation points, which occur at times Tk, Tk+1, Tk+2, Tk+3, etc., are the times at which the WLM 120 attempts to negotiate with the optimizer 110 to generate a new plan for a query that has been placed in the queue 130. A negation interval (between a pair of successive negotiation points) is the amount of time that the optimizer 110 is given to generate a new query plan that complies with a memory constraint provided to the optimizer by the WLM 120. The length of the negotiation intervals can be specified by a database administrator, and more generally, is configurable. An exemplary negotiation interval is 1 second, but shorter or longer negotiation intervals can also be used. As noted above, if the optimizer 110 is unable to generate a new plan within the allotted negotiation interval, then the optimizer 110 is said to have timed-out, in which case it can be said that the optimizer 110 returns 'NULL'. In other words, plan negotiations are conducted based on a series of negotiation intervals shown in FIG. 5. In accordance with certain embodiments, during each negotiation interval, zero or one negotiation takes place. More specifically, as will be explained in additional detail below, the WLM 120 chooses a query, as a negotiation candidate, from the wait queue 130 (if any), calls a negotiation application program interface (API), and waits for a response from the optimizer 110. If optimizer 110 returns a new plan for the candidate to the WLM 120, then the WLM 120 handles the memory bookkeeping and sends the candidate query with its new plan to the executor 140 for execution. If the optimizer 110 returns 'NULL', then the WLM 120 terminates the negotiation and waits for the next negotiation interval. If optimizer 110 does not respond with a new plan in the negotiation interval, the WLM 120 treats the negotiation as 'timed out', terminates it and may start a new negotiation (with the same or a different candidate query) in the next negotiation interval.

Continuing with the above example described with reference to FIGS. 1 and 2 (where queries Q1, Q2 and Q3 are received in that order by the optimizer 110), suppose that during the Q2 plan negotiation, the query Q1 completes execution and releases the used memory, i.e., 6 GB. In this case, the available system memory is then 10 GB again. Under this circumstance, in accordance with certain embodiments of the present technology, instead of using the new plan to execute the query Q2, the WLM 120 can abandon the new plan and send the query Q2 with its original plan (memory cost 5 GB) to the executor 140 for execution. This means that for a given query, the query concurrency control prefers the original plan as this helps the query achieve better performance.

Alternatively, suppose that during the negotiation for the query Q2, a new query Q4 arrives and the WLM 120 estimates that its system memory cost is 3 GB, which is less than the currently available system memory, i.e., 4 GB, and, therefore, the query Q4 satisfies the admission condition. Under this circumstance, in accordance with certain embodiments of the present technology, instead of sending the query Q2 with its new plan to the executor 140 for execution, the WLM 120 leaves the query Q2 in the wait queue 130 and sends the new query Q4 with its original query plan to the executor 140 for execution. This means that given some available system memory, the query concurrency control prefers a query with an original plan (over a query with a new plan generated in accordance with a memory constraint) as this helps the database system achieve better performance. In these cases, the query concurrency control is not affected by the results of the query plan negotiation.

In accordance with certain embodiments of the present technology, when choosing a candidate query from the wait queue 130, a threshold (e.g., 0.6), and a ratio of available system memory to estimated system memory cost for executing an original query plan for a query (without any memory constraints) are used. More specifically, if the ratio is greater than the threshold, the query is chosen as the candidate query for the plan negotiation. If the ratio is not greater than the threshold, then the query has to stay in the wait queue 130 for at least the next candidate selection at the next negotiation interval. When there are multiple candidates available in a negotiation interval, the query with the highest ratio is chosen as the candidate. Continuing with the above example, where queries Q2 and Q3 are placed in the queue 130, the ratio for the query Q2 is 0.8 (i.e., 4 GB/5 GB=0.8) and the ratio for the query Q3 is 0.67 (i.e., 4 GB/6 GB=0.67). Assuming the threshold is 0.6, the ratios for the two queries Q2 and Q3 are both are greater than the threshold 0.6. Here, because the highest ratio is the 0.8 ratio for the query Q2, the query Q2 is therefore chosen as the candidate for the negotiation. The use of such a threshold can guarantee that system memory resources are not overused. That is, a negotiation cannot take place if the available system memory is much smaller than the memory costs of the queued queries. This prevents the potential possibility of running a query with a poor plan, and, therefore, prevents a query from becoming a long-running problematic query and impairing the performance of the entire database system.

Figure 6:
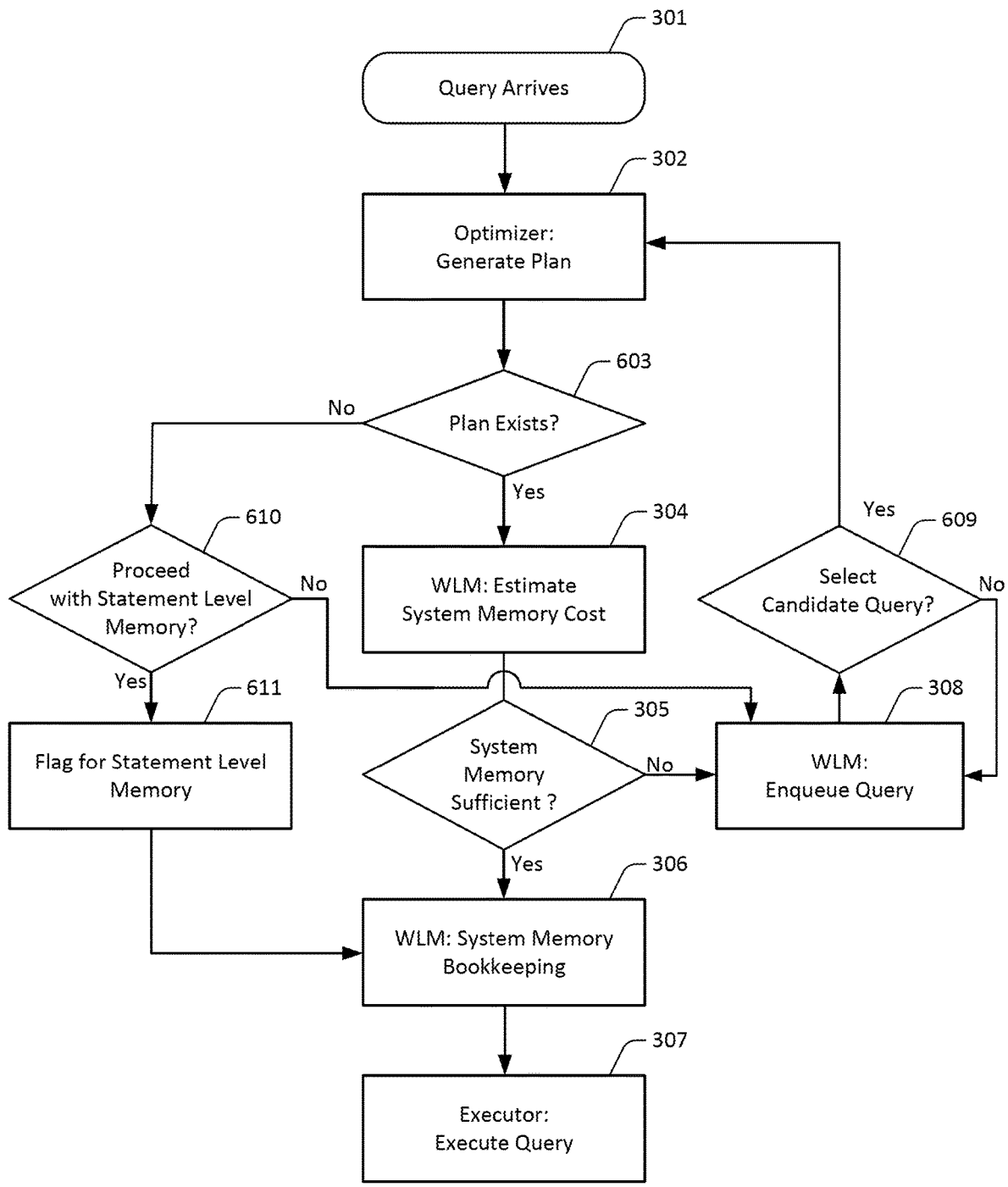
FIG. 6 is a high level flow diagram that is used to summarize methods for managing database query concurrency in accordance with certain embodiments of the present technology.

FIG. 6 is a high level flow diagram that is used to summarize methods for managing database queries concurrently in accordance with certain embodiments of the present technology, which were introduced above. In FIG. 6, steps or blocks that are the same as in FIG. 3 are labeled the same, and newly added steps or blocks include those labeled 603, 609, 610 and 611.

Referring to FIG. 6, at step 301 a query (e.g., Q1) arrives. At step 302, a query plan is generated by the optimizer 110. As explained above, when a plan is initially generated by the optimizer 110 for a particular received query, such a query plan can be referred to as an original query plan. Further, as explained above, an original query plan that is generated for a query (e.g., Q1) is generated without any memory constraints. At step 603 there is a determination of whether a query plan exists for the query, and more specifically, whether the optimizer 110 was able to generate a query plan for the query. In accordance with certain embodiments of the present technology, the optimizer 110 will always be able to generate an original plan without memory constraints for a query. Thus, the first time a determination is performed for a particular query at step 603, the answer will always be Yes. However, there will be instances where the optimizer 110 is unable to generate or negotiate a new plan for a query (after the query has been selected as a candidate from the queue 130) within a specified amount of time, i.e., the negotiation interval. In other words, the answer to the determination at step 603 may be No where there is an attempt to generate a new plan for a query with a memory constraint within a negotiation interval.

At step 304, a system memory cost (e.g., 6 GB) for executing the query using the query plan (generated at step 302) is estimated by the WLM 120. At decision step 305, there is a determination whether there is sufficient system memory available for executing the query plan. For example, at step 305 there is a determination of whether the estimated memory cost (estimated at step 304) for executing the query using the query plan (generated at step 302) is less than or equal to the system memory that is currently available. If the answer to the determination at step 305 is No, then the query is put in the queue 130 by the WLM 120 at step 308. If the answer to the determination at step 305 is Yes, then memory bookkeeping is performed by the WLM 120 at step 306, and the query is executed at step 307 by the executor 140 using the query plan (generated at step 302). For example, at step 306 the WLM subtracts from the currently available system memory (e.g., 10 GB) the estimated memory cost (e.g., 6 GB), to thereby update how much system memory will be available (e.g., 4 GB) while the query (e.g., Q1) is being executed using the query plan. After the query is finished being executed using the query plan, the system memory that was used to execute the query plan will be released, and the WLM 120 will update the available system memory to include the released memory.

As noted above, if the answer to the determination at step 305 is No, the query is placed in the queue 130 by the WLM 120 at step 308, and more specifically by the controller 221 thereof. In accordance with certain embodiments of the present technology, after a query is placed in the queue 130, the WLM 120 can periodically (e.g., at each negotiation point) attempt to select a candidate query from the queue 130. In other words, the WLM 120 can conditionally select a query from the queue 130. As was explained above, this can be achieved by determining, for each query in the queue 130, a ratio of available system memory to estimated system memory cost for executing the original query plan for the query (without any memory constraints), and selecting as the candidate query the query that highest ratio that also satisfies the threshold, if any. Depending upon implementation, a ratio can be said to satisfy the threshold if the ratio is greater than the threshold, or alternatively, if the ratio is at least as great as the threshold. It would also be possible to swap the numerator and denominator of the ratio, in which case the ratio would be a ratio of estimated system memory cost for executing the original query plan for the query (without any memory constraints) to the available system memory. In this latter case, a threshold can be satisfied, depending upon implementation, if the ratio is less than the specified threshold, or alternatively, if the ratio is at least as low as the threshold. Other variations are also possible that are within the scope of the embodiments described herein.

Still referring to FIG. 6, at step 609 there is a determination of whether the WLM 120 was able to successfully select a candidate query from the queue 130. If the answer to the determination at step 609 is No, then there is no attempt to negotiate a new plan for any of the queries (if any exist) include in the queue 130 during the negotiation interval. If the answer to the determination at step 609 is Yes, then flow returns to step 302 and the optimizer 110 attempts to generate a new plan for the query (e.g., Q2) that was selected as the candidate query from the queue 130, wherein the new plan is in compliance with a memory constraint specified by the WLM 120 to the optimizer 110. In other words, where the WLM 120 is able to select a candidate query from the queue 130, the WLM 120 will attempt to negotiate a new query plan with the optimizer 110 for the query with a memory constraint, as was explained above. Thereafter, at step 603 there is a determination whether the optimizer 110 was able to generate a plan for the candidate query in compliance with the memory constraint.

If the answer to the determination at step 603 is Yes, then flow goes to step 304 and the WLM 120 estimates the system memory cost for executing the new query plan determined for the candidate query. Steps 305, 306 and 307, or possibly steps 305 and 308 are thereafter performed in similar manners as were already explained above, and thus, need not be repeated. However, it is noted, that under certain circumstances, some of which were discussed above, and which will be repeated below, it is possible that a new plan for a query will not be used to execute the query. For example, as explained above, a new query plan for a query may not be used to execute the query if sufficient memory is released such that the original plan for the query can be used to execute the query. For another example, a new query plan for a query may not be used to execute the query if a new query arrives and the original plan for the new query can be used to execute the new query without any memory constraints. Such checks as to whether or not to proceed with executing a query using its new plan can be performed, e.g., between steps 305 and 307.

If the answer to the determination at step 603 is No (which means that the optimizer 110 was unable to generate, within the negotiation interval, a new plan for the candidate query that satisfies the system memory constraint), then flow goes to step 610. At step 610 there is a determination as to whether the candidate query should be executed using the above described statement level memory approach. At step 610, the WLM 120 may first check whether the available system memory has changed such that the candidate query can now be executed using the original query execution plan generated for the candidate query. The WLM 120 may do so by comparing the estimated memory cost for the original query execution plan associated with the candidate query to the currently available system memory. If the available system memory is now greater than the estimated memory cost for the original query execution plan associated with the candidate query, then the WLM 120 can send the candidate query to the executor 140 for execution at step 307 using the original query execution plan. If the available system memory is still less than the estimated memory cost for the original query execution plan associated with the candidate query, then the WLM 120 may then check whether any newly received queries can be executed using their original query execution plan. The WLM 120 may do this by comparing the memory cost estimate for any newly received queries to the currently available system memory. If there is a newly received query (e.g., Q4) whose memory cost estimate is less than the available system memory, then the WLM 120 returns the candidate query to the queue 130 and provides the newly received query (e.g., Q4) to the executor 140 for query execution using the original query execution plan generated for the newly received query by the optimizer 110.

If the candidate query still cannot be executed using its original plan, and there are no newly received queries that have an estimated memory cost that is less than the available system memory, the WLM 120 flags the candidate query for statement level memory execution along with a specified memory constraint at step 611. In accordance with certain embodiments, the specified memory constraint is equal to the available system memory. In other embodiments, the specified memory constraint may be the available system memory minus a specified amount, or may be a specified percentage (e.g. 90%) of the available system memory. As discussed above, the statement level memory approach for executing a query uses the original plan for the query in a manner that ensures that execution of the query does not exceed the specified memory constraint, and may involve storing intermediate result files in secondary memory (e.g., on disk) during execution. Once the candidate query is flagged for statement level execution, the WLM 120 performs system memory bookkeeping at step 306 and submits the candidate query to the executor 140 for query execution using the statement level memory approach at step 307.

Figure 7:
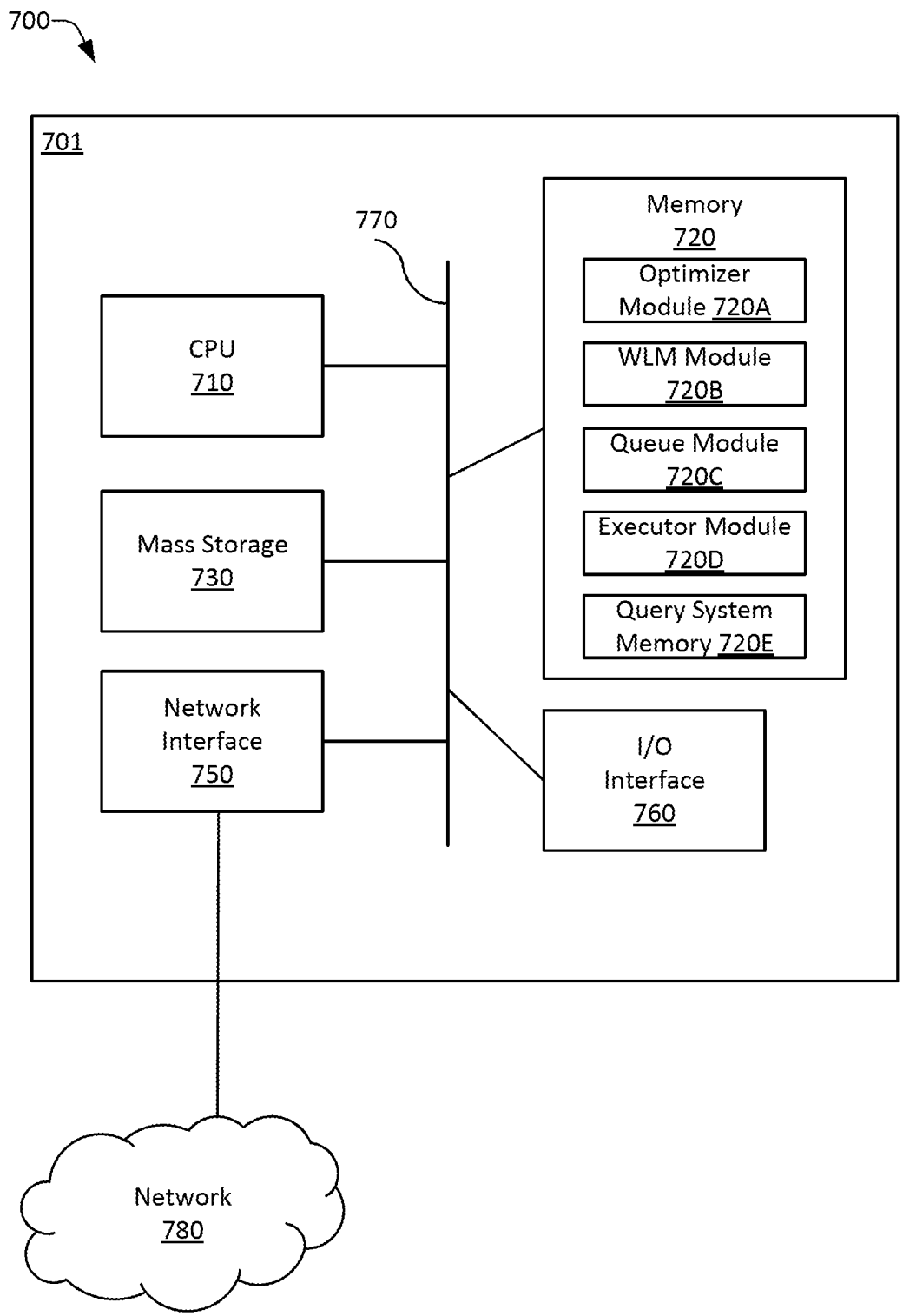
FIG. 7 illustrates a block diagram of a network system that can be used to implement various embodiments of the present technology.

FIG. 7 is a block diagram of a network system that can be used to implement various embodiments of the present technology described herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system 700 may comprise a processing unit 701 equipped with one or more input/output devices, such as network interfaces, storage interfaces, and the like. The processing unit 701 may include a central processing unit (CPU) 710, memory 720, mass storage 730, and an I/O interface 760 connected to a bus 770. The bus may be one or more of any type of several bus architectures including a memory bus or memory controller, a peripheral bus or the like. For example, a memory bus may connect the CPU 710 directly to the memory 720.

The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory.

In one embodiment, operations or procedures described above may be performed based on modules stored or instantiated in the memory 720. For example, the memory 720 may include an optimizer module 720A, a WLM module 720B, a queue module 720C, and an executor module 720D. The memory can also include a portion thereof, labeled query memory 720E, which is system memory that is devoted for use in performing database queries. For example, the query memory 720E may include 10 GB (or some other amount) of system memory that is available for executing queries. The optimizer module 720A in combination with the CPU 710 may implement the optimizer 110 discussed above. The WLM module 720B in combination with the CPU 710 may implement the WLM 120 discussed above. The queue module 720C alone or in combination with the CPU 710 may implement the wait queue 130 discussed above. The executor module 720D in combination with the CPU 710 may implement the executor 140 discussed above. In other words, the various elements described above with reference to FIG. 4 can be implemented using a combination of hardware, software and/or firmware. Other variations are also possible and are within the scope of the embodiments described herein.

The mass storage 730 may comprise one or more types of secondary storage devices configured to store data, programs, and other information and to make the data, programs, and other information accessible via the bus. The mass storage 730 may comprise, for example, one or more of a solid state drive, hard disk drive, a magnetic disk drive, an optical disk drive, or the like. The mass storage 730 may be used to store intermediate result files during a statement level approach for executing a query using a query plan, in accordance with certain embodiments of the present technology. The mass storage 730 may also include one or more databases on which queries may be run using embodiments of the present technology.

The processing unit 701 also includes one or more network interfaces 750, which may comprise wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

There are various benefits of to using embodiments of the present technology. For example, embodiments described herein can be used to complement current memory-aware query concurrency control already implemented in OLAP Data Warehouses. Embodiments of the present technology can also be used to improve query concurrency levels, while controlling memory contention at an acceptable high level. Thus, the utilization of all system resources (not only memory's but also CPU's and I/O's) is improved, while severe performance problems, such as OOM, are avoided. In generally, embodiments of the present technology can be used to improve overall system performance. As more queries are executed at the same time, the averaged (in an observation period) database system throughput beneficially increases and the averaged query response time beneficially decreases, which greatly improves a customer's use experience. Further, by utilizing embodiments of the present technology, customer database servers can achieve higher query concurrency levels and higher system resource utilization, and, therefore, potentially create higher profits for the customers such as service providers.

The flowcharts and block diagrams in the figures illustrate the architecture, functionality, and operation of possible implementations of a device, apparatus, system, computer-readable medium and method according to various aspects of the present disclosure. In this regard, each block (or arrow) in the flowcharts or block diagrams may represent operations of a system component, software component or hardware component for implementing the specified logical function(s). It should also be noted that, in some alternative implementations, the functions noted in the block may occur out of the order noted in the figures. For example, two blocks (or arrows) shown in succession may, in fact, be executed substantially concurrently, or the blocks (or arrows) may sometimes be executed in the reverse order, depending upon the functionality involved. It will also be noted that each block (or arrow) of the block diagrams and/or flowchart illustration, and combinations of blocks (or arrows) in the block diagram and/or flowchart illustration, can be implemented by special purpose hardware-based systems that perform the specified functions or acts, or combinations of special purpose hardware and computer instructions.

It will be understood that each block (or arrow) of the flowchart illustrations and/or block diagrams, and combinations of blocks (or arrows) in the flowchart illustrations and/or block diagrams, may be implemented by non-transitory computer instructions. These computer instructions may be provided to and executed (or read) by a processor of a general purpose computer (or computing device), special purpose computer, or other programmable data processing apparatus to produce a machine, such that the instructions executed via the processor, create a mechanism for implementing the functions/acts specified in the flowcharts and/or block diagrams.

As described herein, aspects of the present disclosure may take the form of at least a system, device having one or more processors executing instructions stored in non-transitory memory, a computer-implemented method, and/or non-transitory computer-readable storage medium storing computer instructions.

Non-transitory computer-readable media includes all types of computer-readable media, including magnetic storage media, optical storage media, or solid state storage media and specifically excludes signals. It should be understood that software including computer instructions can be installed in and sold with a computing device having computer-readable storage media. Alternatively, software can be obtained and loaded into a computing device, including obtaining the software via a disc medium or from any manner of network or distribution system, including, for example, from a server owned by a software creator or from a server not owned but used by the software creator. The software can be stored on a server for distribution over the Internet, for example.

More specific examples of the computer-readable medium include the following: a portable computer diskette, a hard disk, a random access memory (RAM), ROM, an erasable programmable read-only memory (EPROM or Flash memory), an appropriate optical fiber with a repeater, a portable compact disc read-only memory (CD-ROM), an optical storage device, a magnetic storage device, or any suitable combination thereof.

Non-transitory computer instructions used in embodiments of the present technology may be written in any combination of one or more programming languages. The programming languages may include an object oriented programming language such as Java, Scala, Smalltalk, Eiffel, JADE, Emerald, C++, CII, VB.NET, Python, R or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The computer instructions may be executed entirely on the user's computer (or computing device), partly on the user's computer, as a stand-alone software package, partly on the user's computer and partly on a remote computer, or entirely on the remote computer or server. In the latter scenario, the remote computer may be connected to the user's computer through any type of network, or the connection may be made to an external computer (for example, through the Internet using an Internet Service Provider) or in a cloud computing environment or offered as a service such as a Software as a Service (SaaS).

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the detailed description of the present subject matter, numerous specific details are set forth in order to provide a thorough understanding of the present subject matter. However, it will be clear to those of ordinary skill in the art that the present subject matter may be practiced without such specific details.

Although the subject matter has been described in language specific to structural features and/or methodological steps, it is to be understood that the subject matter defined in the appended claims is not necessarily limited to the specific features or steps (acts) described above. Rather, the specific features and steps described above are disclosed as example forms of implementing the claims.

What is claimed is:

1. A computer-implemented method for managing database query concurrency, comprising:
generating a first query plan specifying a first set of one or more operators that can be used to execute a query in system memory, the first query plan lacking any system memory constraints;
estimating a system memory cost for executing the query in the system memory using the first query plan;
tracking available system memory;
determining, based on the estimated system memory cost and the available system memory, whether the available system memory is sufficient for executing the query using the first query plan specifying the first set of one or more operators and the first query plan lacking any system memory constraints;
placing the query in a wait queue in response to determining that the available system memory does not satisfy the estimated system memory cost for executing the query in the system memory using the first query plan, wherein if the available system memory had satisfied the estimated system memory cost for executing the query in the system memory using the first query plan then the first query plan would have been executed without placing the query in the wait queue;
after placing the query in the wait queue, selecting the query from the wait queue, wherein one or more other queries may be selected from the wait queue between a wait queue placement time when the query is placed in the wait queue and a wait queue selection time when the query is selected from the wait queue;
after the query is selected from the wait queue, generating a second query plan for the query within a negotiation interval, the second query plan to be used to execute the query in the system memory in compliance with a system memory constraint, the second query plan specifying a second set of one or more operators that differs from the first set of one or more operators specified for the first query plan; and
after the query is selected from the wait queue, conditionally executing the query in the system memory using the second query plan if the second query plan is generated within the negation interval for the query in compliance with the system memory constraint.

2. The method of claim 1, wherein executing the query in the system memory using the first query plan that is lacking any system memory constraints takes less time than executing the query in the system memory using the second query plan that complies with the system memory constraint.

3. The method of claim 1, wherein the selecting the query from the wait queue is performed at regular negotiation intervals, with the regular negotiation intervals having a specified length.

4. The method of claim 1, wherein the system memory constraint is equal to the available system memory when the query is selected from the wait queue.

5. The method of claim 1, wherein the selecting the query from the wait queue comprises:
when there are one or more queued queries in the wait queue, determining, for each queued query of the one or more queued queries in the wait queue, a ratio of an estimated system memory cost to the available system memory, with the estimated system memory cost being estimated for executing the queued query in the system memory without any system memory constraints; and
selecting the query from the wait queue when the query has a highest ratio that also satisfies a specified threshold.

6. The method of claim 1, wherein after the query is selected from the wait queue, in response to the second query plan not being generated within the negotiation interval for the query in compliance with the system memory constraint, executing the query in the system memory using the first query plan and using a statement level memory approach, which specifies an amount of the system memory that can be used to execute the query in the system memory and includes storing intermediate files in secondary storage while executing the query using the first query plan.

7. The method of claim 1, wherein, after the second query plan has been generated for the query in compliance with the system memory constraint, the conditionally executing the query in the system memory comprises:
determining whether the available system memory satisfies the estimated memory cost for executing the query using the first query plan that is lacking any system memory constraints;
executing the query using the first query plan instead of executing the query using the second query plan if the available system memory satisfies the estimated memory cost for executing the query using the first query plan; and executing the query using the second query plan if the available system memory does not satisfy the estimated memory cost for executing the query using the first query plan that is lacking any system memory constraints.

8. The method of claim 1, wherein, after the second query plan has been generated for the query, the conditionally executing the query in the system memory comprises:

determining whether the available system memory satisfies an estimated system memory cost for executing a newly received query in the system memory using a third query plan that is lacking any system memory constraints;

executing the newly received query using the third query plan instead of executing the query using the second query plan if the available system memory satisfies the estimated system memory cost for executing the newly received query in the system memory using the third query plan that is lacking any system memory constraints; and executing the query using the second query plan if the available system memory does not satisfy the estimated system memory cost for executing the newly received query in the system memory using the third query plan that is lacking any system memory constraints.

9. The method of claim 1, wherein, after the second query plan has been generated for the query, the conditionally executing the query in the system memory comprises:

determining whether the available system memory satisfies at least one of the estimated memory cost for executing the query using the first query plan that is lacking any system memory constraints or an estimated system memory cost for executing a newly received query in the system memory using a third query plan for executing the newly received query that is lacking any system memory constraints;

executing the query using the first query plan or the new query using the third query plan instead of executing the query using the second query plan if the available system memory satisfies at least one of the estimated memory cost for executing the query using the first query plan that is lacking any system memory constraints or the estimated system memory cost for executing the newly received query in the system memory using the third query plan that is lacking any system memory constraints; and executing the query using the second query plan if the available system memory does not satisfy at least one of the estimated memory cost for executing the query using the first query plan that is lacking any system memory constraints or the estimated system memory cost for executing the newly received query in the system memory using the third query plan that is lacking any system memory constraints.

10. A database query concurrency management system, comprising:

a non-transitory memory storage comprising instructions; and one or more processors in communication with the non-transitory memory storage, wherein the one or more processors execute the instructions to:

generate a first query plan specifying a first set of one or more operators that can be used to execute a query in system memory, the first query plan lacking any system memory constraints;

estimate a system memory cost for executing the query in the system memory using the first query plan;

track available system memory;

determine, based on the estimated system memory cost and the available system memory, whether the available system memory is sufficient for executing the query using the first query plan specifying the first set of one or more operators and the first query plan lacking any system memory constraints;

place the query in a wait queue in response to a determination that the available system memory does not satisfy the estimated system memory cost for executing the query in the system memory using the first query plan, wherein if the available system memory had satisfied the estimated system memory cost for executing the query in the system memory using the first query plan then the first query plan would have been executed without placing the query in the wait queue;

after the query has been placed in the wait queue, select the query from the wait queue, wherein one or more other queries may be selected from the wait queue between a wait queue placement time when the query is placed in the wait queue and a wait queue selection time when the query is selected from the wait queue;

after the query is selected from the wait queue, generate a second query plan for the query within a negotiation interval, the second query plan to be used to execute the query in the system memory in compliance with a system memory constraint, the second query plan specifying a second set of one or more operators that differs from the first set of one or more operators specified for the first query plan; and after the query is selected from the wait queue, conditionally execute the query in the system memory using the second query plan if the second query plan is generated within the negation interval for the query in compliance with the system memory constraint.

11. The system of claim 10, wherein the one or more processors execute the instructions to select the query from the wait queue at regular negotiation intervals, with the regular negotiation intervals having a specified length.

12. The system of claim 11, wherein, in order to select the query from the wait queue, the one or more processors execute the instructions to:

determine, for each queued query of the one or more queued queries in the wait queue, a ratio of an estimated system memory cost to the available system memory, with the estimated system memory cost being estimated for executing the queued query in the system memory without any system memory constraints; and select the query from the wait queue when the query has a highest ratio that also satisfies a specified threshold.

13. The system of claim 10, wherein after the query is selected from the wait queue, in response to the second query plan not being generated within the negation interval for the query in compliance with the system memory constraint, the one or more processors execute the instructions to:

execute the query in the system memory using the first query plan and using a statement level memory approach, which specifies an amount of the system memory that can be used to execute the query in the system memory and includes storing intermediate files in secondary storage, if the second query plan has not been generated for the query in compliance with the system memory constraint within the negotiation interval.

14. A non-transitory computer-readable medium storing computer instructions for managing database query concurrency, that when executed by one or more processors, cause the one or more processors to perform the steps of:
   generating a first query plan specifying a first set of one or more operators that can be used to execute a query in system memory, the first query plan lacking any system memory constraints;
   estimating a system memory cost for executing the query in the system memory using the first query plan;
   tracking available system memory;
   determining, based on the estimated system memory cost and the available system memory, whether the available system memory is sufficient for executing the query using the first query plan specifying the first set of one or more operators and the first query plan lacking any system memory constraints;
   placing the query in a wait queue in response to determining that the available system memory does not satisfy the estimated system memory cost for executing the query in the system memory using the first query plan, wherein if the available system memory had satisfied the estimated system memory cost for executing the query in the system memory using the first query plan then the first query plan would have been executed without placing the query in the wait queue;
   after placing the query in the wait queue, selecting the query from the wait queue, wherein one or more other queries may be selected from the wait queue between a wait queue placement time when the query is placed in the wait queue and a wait queue selection time when the query is selected from the wait queue;
   after the query is selected from the wait queue, generating a second query plan for the query within a negotiation interval, the second query plan to be used to execute the query in the system memory in compliance with a system memory constraint, the second query plan specifying a second set of one or more operators that differs from the first set of one or more operators specified for the first query plan; and
   after the query is selected from the wait queue, conditionally executing the query in the system memory using the second query plan if the second query plan is generated within the negation interval for the query in compliance with the system memory constraint.

15. The non-transitory computer-readable medium of claim 14, wherein the selecting the query from the wait queue is performed at regular negotiation intervals, with the regular negotiation intervals having a specified length.

16. The non-transitory computer-readable medium of claim 14, wherein the selecting the query from the wait queue comprises:
   when there are one or more queued queries in the wait queue, determining, for each queued query of the one or more queued queries in the wait queue, a ratio of an estimated system memory cost to the available system memory, with the estimated system memory cost being estimated for executing the queued query in the system memory without any system memory constraints; and
   selecting the query from the wait queue when the query has a highest ratio that also satisfies a specified threshold.

17. The non-transitory computer-readable medium of claim 14, wherein after the query is selected from the wait queue, in response to the second query plan not being generated within the negotiation interval for the query in compliance with the system memory constraint, executing the query in the system memory using the first query plan and using a statement level memory approach, which specifies an amount of the system memory that can be used to execute the query in the system memory and includes storing intermediate files in secondary storage while executing the query using the first query plan.

* * * * *